No. 690,360. Patented Dec. 31, 1901.
A. E. CANEDY.
DRIVING MOTOR.
(Application filed Aug. 12, 1901.)
(No Model.)

Witnesses
Chas. K. Davies.
Harold S. Johnson.

Inventor
A. E. Canedy
By M. A. Bartlett
Attorney

UNITED STATES PATENT OFFICE.

ALBERT EARL CANEDY, OF CHICAGO HEIGHTS, ILLINOIS.

DRIVING-MOTOR.

SPECIFICATION forming part of Letters Patent No. 690,360, dated December 31, 1901.

Application filed August 12, 1901. Serial No. 71,823. (No model.)

*To all whom it may concern:*

Be it known that I, ALBERT EARL CANEDY, residing at Chicago Heights, in the county of Cook and State of Illinois, have invented certain new and useful Improvements in Driving-Motors, of which the following is a specification, reference being had therein to the accompanying drawings.

This invention relates to driving-motors for fan-blowers and other like implements or machines which are driven at high speed by small power, such as hand-power.

The object of the invention is to produce a compact driving-gear in a simple casing which may readily be attached to the fan or other driven machine, yet which may be complete in itself and easily accessible.

Figure 1:
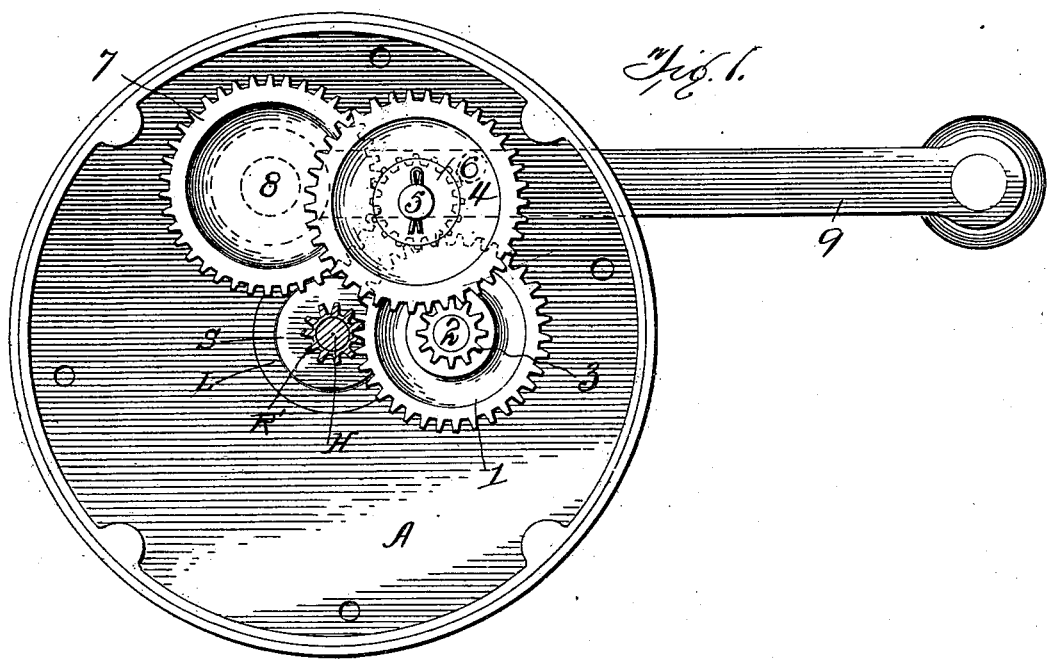
Figure 2:
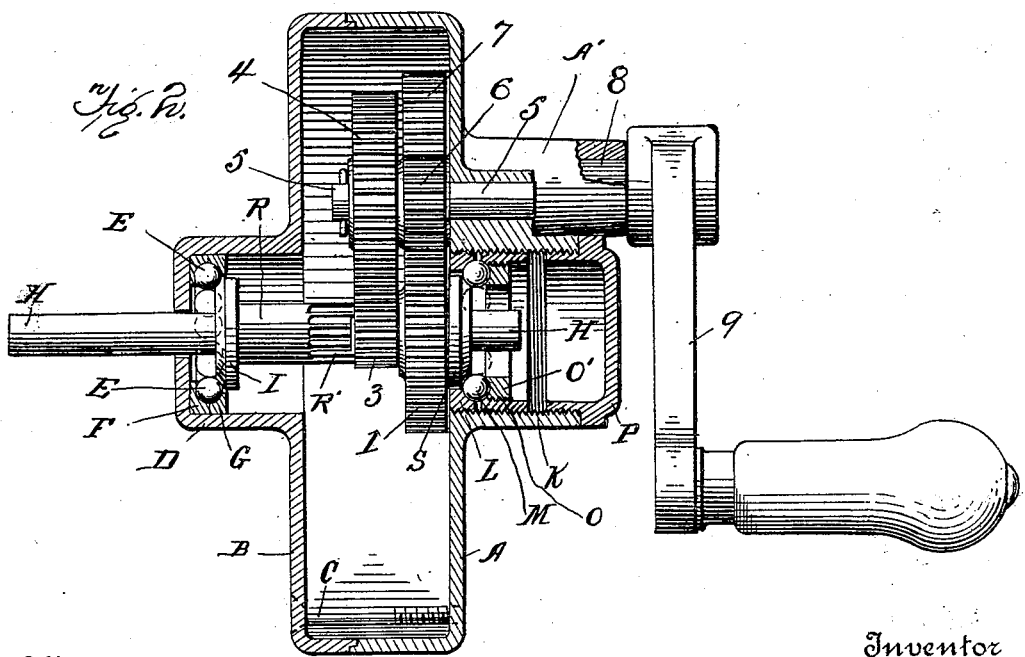

Figure 1 is a view of the casing and gearing with cover removed, showing shaft and sleeve in section. Fig. 2 is a central section of the casing with all the gears in elevation.

The casing is composed of two sections A and B, these parts being held together by screws, as C, or by other suitable means. The section B has a hollow hub D, in which there is a seat for ball-bearings E. The balls are held between rings F G. The ring G may be a broken ring and by its elasticity will retain itself and the balls E in position.

The driving-shaft H has a collar I connected rigidly and which bears on the balls E, and so holds the shaft H centered in the hub D, and the balls E take the endwise thrust of the shaft.

The casing-section A has a hollow hub K, which is internally screw-threaded. In the inner end of this hub a ring L is applied, said ring serving as a support for balls M. A double bushing-ring serves to retain the balls M M in place, this double bushing-ring being composed of a threaded ring O, which screws into the hub, and a second ring O', which screws into the ring O. Both the rings O and O' are adjustable, so as to retain the balls M in place and to take up wear and hold the bearings firmly against the bearing-collars on the shaft. Rings O O' are accessible from the outside of the casing by removing the screw-cap P.

The shaft H has a sleeve R rigidly affixed, and sleeve R carries the collars I and S, which are the bearings for the sleeve and shaft. As the balls M can be set up against collar S, the bearings of the sleeve and shaft are thus capable of regulation. The sleeve R is held between end-thrust bearings, as shown, and is thus very evenly supported. On the sleeve R there is a geared section R', with which a driving-pinion may engage. This sleeve and the shaft keyed thereto receive rotary motion from pinion 1, which pinion is supported on pintle 2 in the casing. (Not shown in Fig. 2.) The pinion 1 is rigid with pinion 3, of smaller diameter than pinion 1. Pinion 3 gears with pinion 4, which turns on pintle 5, fixed in the casing. A smaller pinion 6 is rigid with pinion 4. This pinion 6 gears with the pinion 7, which is connected to the crank-shaft 8. Crank-shaft 8 has bearings in boss A' of the casing.

Crank-shaft 8 may be driven by crank-handle 9. The power may thus be transmitted from crank 9 through the gears 7, 6, 4, 3, and 1 to the sleeve R and shaft H, such a train being a multiplying gear or train for increasing speed. The application of power to shaft H will constitute the train a reducing-train going toward the crank.

The train of gears 1 to 8 remains in the casing without regard to the position of sleeve R and its gear R'. Thus the taking up of wear on the thrust-bearings I and S does not interfere with the train of gears carried by the casing. The shaft H may be tightened by removing cap P, and the gears may be replaced by removing casing-section B, in each case without interfering with other parts of the device.

What I claim is—

1. In a driving-motor, the divided casing, the central shaft and a sleeve thereon provided with thrust-bearings, one of which is supported by antifriction-balls in each casing-section, the train of accelerating-gears carried entirely by one of the casing-sections but engaging a gear on the central shaft, and the crank-shaft extending from and supported by the casing-section which carries the accelerating-gears, all combined.

2. In a driving-motor, the divided casing having one section provided with a fixed thrust-bearing, and the other section having an adjustable thrust-bearing, a removable cap over the adjustable thrust-bearing, and an accelerating-gear carried by one of the casing-sections and engaging with gear on the shaft between the thrust-bearings, whereby the thrust-bearings and the driving-train are separately accessible, all the named elements and their necessary coöperative adjuncts combined substantially as described.

3. In a motor-driver, the divided casing, the shaft having a sleeve thereon provided with thrust-collars, a thrust-bearing in one casing-section against which one of the collars bears, a boss on the other section having internal screw-threads and threaded rings therein acting as supports for bearing-balls, which support the thrust of the other collar, and a driving-train supported on one cover-section and engaging with gear on the shaft between the thrust-collars, all the named elements combined substantially as described.

In testimony whereof I affix my signature in presence of two witnesses.

ALBERT EARL CANEDY.

Witnesses:
FRED KIRGIS,
DAVID WALLACE.